United States Patent [19]

Desai et al.

[11] 4,207,601

[45] Jun. 10, 1980

[54] TRANSIENT TEMPERATURE COMPENSATION FOR MOVING HEAD DISK DRIVE

[75] Inventors: Ashok K. Desai, Chatsworth; Abraham Brand, Encino; Eric M. Dunstan, Hidden Hills; Raymond J. Marinello, Valencia, all of Calif.

[73] Assignee: Pertec Computer Corporation, Los Angeles, Calif.

[21] Appl. No.: 929,913

[22] Filed: Aug. 1, 1978

[51] Int. Cl.² .................. G11B 5/56; G11B 21/10; G05D 23/275
[52] U.S. Cl. ............................ 360/78; 360/77; 360/98; 318/634
[58] Field of Search ............... 360/78, 77, 109, 99, 360/75, 97-98, 86; 318/634

[56] References Cited

U.S. PATENT DOCUMENTS

| | | | |
|---|---|---|---|
| 3,720,930 | 3/1973 | Elsing | 360/75 |
| 3,753,254 | 8/1973 | Ruble et al. | 360/77 |
| 3,757,189 | 9/1973 | Buchan | 318/634 |
| 3,775,655 | 11/1973 | DuVall | 318/634 |
| 3,900,782 | 8/1975 | Hammerschmitt | 318/634 |
| 4,056,831 | 11/1977 | Godbout et al. | 360/78 |
| 4,121,265 | 10/1978 | Derc | 360/78 |
| 4,122,503 | 10/1978 | Allan | 360/77 |

*Primary Examiner*—Alfred H. Eddleman
*Attorney, Agent, or Firm*—Freilich, Hornbaker, Wasserman, Rosen & Fernandez

[57] ABSTRACT

A transient temperature compensation system for use in a magnetic disk drive comprised of both fixed and removable disks. The system includes first and second thermistors respectively mounted immediately adjacent the fixed and removable disks. The second thermistor is preferably mounted for movement between an operative position and an inoperative position. In the operative position, the thermistor is positioned in very close proximity to the disk. In the inoperative position, the thermistor is spaced from the disk to permit sufficient clearance to enable the disk to be removed from the drive. The outputs of the two thermistors are used to develop a signal representing the temperature differential between the two discs which signal is supplied to the disk drive head positioning system. This signal is used to modify the positioning of the heads relative to the fixed disk to compensate for differences in the radial positions of corresponding tracks on the fixed and removable disks.

8 Claims, 3 Drawing Figures

TRANSIENT TEMPERATURE COMPENSATION FOR MOVING HEAD DISK DRIVE

BACKGROUND OF THE INVENTION

Magnetic disk drives for recording digital data are well known in the art. In the design of such drives, it is usually an objective to achieve the highest recording density possible for a given cost. Recording density is of course dependent on both the number of annular tracks per radial inch of disk surface and the number of bits per inch along a track. The maximum number of tracks which can be recorded per inch is in turn dependent on the precision of the head positioning system. Typically, the head positioning system includes a linear motor connected in a servo loop which also includes position control logic circuitry and a summing amplifier. In use, the address of a destination track is supplied to the logic circuitry which in turn supplies an analog signal to the summing amplifier which develops a positioning signal for application to the linear motor positioner coil. Additionally, one or more offset or compensation signals may be supplied to the summing amplifier to enhance precise positioning. For example, it has been common practice to sense the temperature of the air moving past the disk and supply a signal representative thereof to the summing amplifier in order to offset head positioning to compensate for disk expansion or contraction.

The present invention is useful in disk drives employing both fixed and removable disks. Such drives are well known in the art and find extensive applications where the user requires the permanent storage of some data and the easy interchangeability of other data. In the use of such drives employing both fixed and removable disks, head positioning problems are typically encountered if, after a disk is replaced, operation is attempted without waiting for the removable disk temperature to become substantially equal to the temperature of the fixed disk.

SUMMARY OF THE INVENTION

The present invention is directed to an improved temperature compensation system for sensing the temperature differential between fixed and removable disks to enable heads to be precisely positioned with respect to the removable disk without waiting for the removable disk temperature to become substantially equal to the temperature of the fixed disk.

In accordance with a significant feature of the disclosed embodiment, a temperature sensor is mounted for movement between an operative position in close proximity to the removable disk and an inoperative position spaced from the disk to provide sufficient clearance to enable the disk to be removed from the drive.

In accordance with the disclosed embodiment, a temperature compensation subsystem is incorporated within a head positioning system of a disk drive employing a spindle carrying both a fixed disk and a removable disk. The temperature compensation subsystem utilizes first and second thermistors which, when operating, are mounted immediately adjacent to the fixed and removable disks, respectively. Circuit means are provided for producing a temperature signal indicative of the difference in temperature between the fixed and removable disks. This temperature signal is utilized to modify the current which would otherwise be supplied to the head positioner coil to position the heads in response to address signals identifying particular tracks on the removable disk.

The novel features of the invention are set forth with particularity in the appended claims. The invention will best be understood from the following description when read in conjunction with the accompanying drawing.

DETAILED DESCRIPTION OF THE DISCLOSED EMBODIMENT OF THE INVENTION

Figure 1:
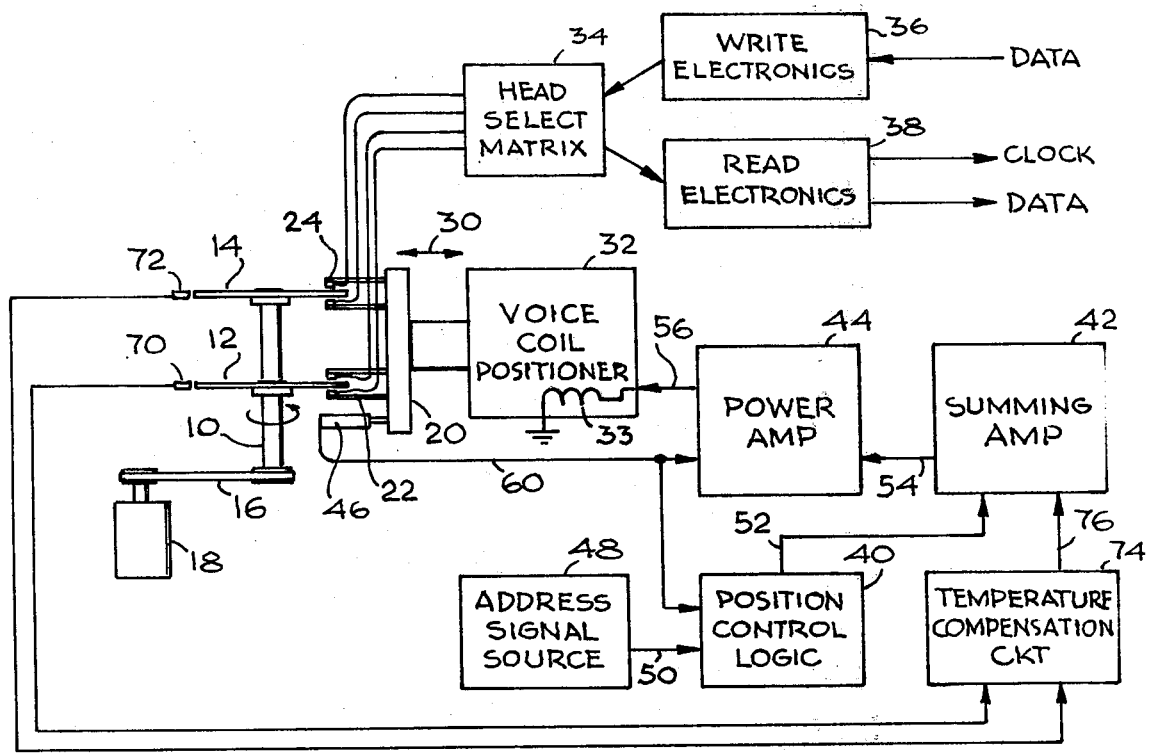
FIG. 1 is a schematic block diagram of a moving head magnetic disk drive incorporating a temperature compensation system in accordance with the present invention.

Attention is initially directed to FIG. 1 which illustrates a disk drive system of a type well known in the art, which has been modified to incorporate a temperature compensation system in accordance with the present invention. Briefly, the disk drive system is comprised of a drive spindle 10 having a first data recording disk 12 fixedly mounted thereon. Additionally, a removable disk 14 is also mounted on the spindle 10 for rotation therewith. Disk drives containing both fixed and removable disks are readily known in the art and are typified, for example, by disk drive model D3400 manufactured by Pertec Computer Corporation. Such drives may contain one or more fixed disks and likewise may contain one or more removable disks. However, in practice, it is more frequent that the removable disk comprises a single disk mounted within a cartridge such as the 2315 or 5440 type cartridges, well known in the art. Since the particular type of removable disk is not significant in accordance with the invention, further reference herein will be made merely to the "fixed disk" (12) or "removable disk" (14), and it will be understood that these disks can comprise various types well known in the art.

The spindle 10 is typically driven by belt 16 which in turn is driven by motor 18.

The drive of FIG. 1 further includes a head positioning system which also is generally well known in the art. The head positioning system is comprised of a comb structure 20 having a plurality of forwardly projecting head carrying arms 22. A head 24 is carried at the end of each arm 22 in close proximity to one of the disk surfaces. The comb structure 20 is mounted for radial movement with respect to the disks, as represented by the two-headed arrow 30. The comb structure 20 is driven by a linear motor or voice coil positioner 32, of a type well known in the art. By supplying an appropriate current to the positioner coil 33, the comb structure 20 can be radially moved relative to the disks to position the heads 24 adjacent any one of a plurality of annular tracks defined on each disk surface. The annular tracks on each disk surface are arranged concentrically and each concentric track describes a circle which, when extended vertically through the stack of disks, forms an imaginary cylinder. The comb structure 20 can be moved to position the heads 24 in alignment with any selected one of the plurality of cylinders defined by the disk stack. When the comb structure 20 is positioned at the desired cylinder, a head select matrix 34 selects one of the multiple heads for reading or writing. Data applied to write electronics circuit 36 is applied through the head select matrix 34 to the selected head 24 for recording data on a disk surface. Similarly, data is read from a head selected by the matrix 34 via the read electronics circuitry 38.

The positioner coil 33 is connected in a servo loop which basically includes a position control logic circuit 40, a summing amplifier 42, a power amplifier 44, and a position transducer 46. In the typical operation of a prior art drive such as the previously mentioned model D3400, address signals are supplied from an address signal source 48 via line 50 to the position control logic circuitry 40. The signals provided by source 48 generally comprise digital signals identifying a destination cylinder. The position control logic 40 responds to the digital address signals to in turn supply an analog signal via line 52 to the summing amplifier 42. Other inputs may typically be provided to the summing amplifier 42 to effect certain offsets and compensate for various factors, such as an abnormal temperature condition. The output of the summing amplifier 42 is coupled via line 54 to the power amplifier 44 which supplies a drive current via line 56 to the positioner coil 33. The position transducer 46 senses the position of the comb structure 20 and feeds back a signal proportional to position via line 60 to the position control logic 40 and in this manner the positioner servo loop can be caused to move the heads to a cylinder identified by the signals supplied by address signal source 48.

It has been common in the prior art to sense the temperature of the air moving over one of the disk surfaces to modify the head position to compensate for any expansion or contraction of the disk relative to a known reference temperature. Such compensation can typically be introduced by providing an input to the summing amplifier 42 to modify the current supplied to the positioner coil 33 by the power amplifier 44. The present invention is directed to an improved temperature compensation system particularly applicable to disk drives employing both fixed and removable disks.

In typical prior art disk drives employing both fixed and removable disks, the temperature of the fixed disk 12 will rise to a certain temperature after a period of operation. If the removable disk 14 is then replaced, a certain interval of time (perhaps on the order of 10 minutes) is required for the temperature of the removable disk to become substantially equal to the temperature of the fixed disk. Because of the difference in radial position of corresponding tracks on the fixed and removable disks, head positioning problems may be encountered, particularly in high track density drives having as many as 200 tracks per radial inch, if operation is attempted during this interval. The present invention is directed to a temperature compensation system which facilitates the precise positioning of the heads over tracks on the removable disk, by taking into consideration the difference in temperature between the fixed and removable disks. Utilization of the invention reduces the waiting period required to reliably operate the drive after the removable disk has been replaced. Basically, the invention involves a modification of the positioner system of FIG. 1 to incorporate temperature sensors 70 and 72 mounted immediately adjacent the fixed and removable disks 12 and 14. The temperature sensors 70 and 72 provide signals to temperature compensation circuitry 74 which in turn supplies an analog signal via line 76 to the summing amplifier 42 to modify the current supplied to the positioner coil 33 by power amplifier 44 when information is to be written on or read from the removable disk.

Figure 2:
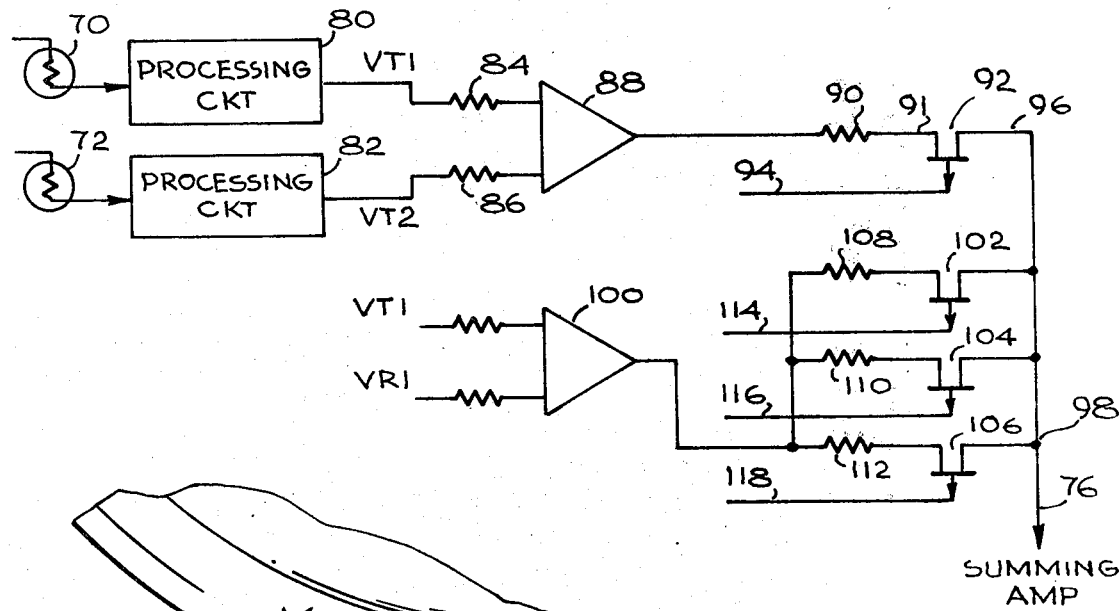
FIG. 2 is a schematic circuit diagram illustrating a circuit in accordance with the present invention.

Attention is now directed to FIG. 2 which comprises a schematic circuit diagram of the temperature sensors 70 and 72 and temperature compensation circuitry 74 previously discussed in connection with FIG. 1. FIG. 2 assumes that temperature sensors 70 and 72 comprise thermistors which are closely matched. Such thermistors are commercially available devices which exhibit a variable resistance, the value of which is dependent upon temperature. The thermistors 70 and 72 are respectively connected to processing circuits 80 and 82 which develop output voltages VT1 and VT2 having values directly related to the temperatures sensed by the thermistors. The voltages VT1 and VT2 are respectively applied through resistors 84 and 86 to the input of a differential amplifier 88 which produces an output voltage directly related to the magnitude of the difference between the voltages VT1 and VT2. The output of amplifier 88 is connected through resistor 90 to the source terminal of field effect transistor 92. The gate terminal 94 of transistor 92 is enabled for a certain interval subsequent to the replacement of a removable disk into a warm drive. The drain terminal 96 of transistor 92 is connected to a summing junction 98 which supplies a compensation current to summing amplifier 42. This compensation current modifies the current through positioner coil 33 to compensate for the temperature difference between the fixed and removable disks.

As previously pointed out, the voltage VT1 is representative of the temperature sensed by thermistor 70 immediately adjacent to the fixed disk 12. In addition to being compared with voltage VT2 by amplifier 88, voltage VT1 is also compared with a reference voltage VR1 by differential amplifier 100 to determine the difference in temperature between the fixed disk 12 and a reference temperature for which the drive has been adjusted. That is, in initially setting up any disk drive to assure precision positioning of the heads, adjustments are made at a certain reference temperature. If the operating temperature of the fixed disk varies substantially from the reference temperature, it is necessary to develop a temperature compensation signal to move the heads either slightly inwardly or outwardly (depending upon whether the fixed disk temperature is higher or lower than the reference temperature) in order to assure precise positioning of the heads over the track. The output signal developed by the differential amplifier 100 is supplied to the source input terminals of transistors 102, 104 and 106 via differently valued biasing resistors 108, 110, and 112. The transistors 102, 104, 106 have gate terminals 114, 116 and 118. At any one time, the particular gate terminals enabled depend upon the particular track over which the selected heads are being positioned. That is, at any elevated temperature, the outer tracks will be further displaced from their reference position than the inner tracks. Thus, if the positioner is seeking a track on a disk surface close to the disk edge, a greater amount of position modification will be necessary than if the track being sought is closer to the center of the disk. The particular transistors 102, 104, 106 which are enabled at any point in time depends upon the particular track being sought. The transistors which are enabled by an enabling signal applied to the gate terminals will supply a current at their drain terminals related to the value of the voltage supplied by the differential amplifier 100, biased by the input resistors 108, 110, 112 connected to the transistor source terminals. Thus, the output of the enabled transistors 102, 104, 106 will supply a compensation current to junction 98 which acts to modify the current which would otherwise be produced through the positioner coil 33 as a consequence of the address signals supplied from source 48 to the logic circuitry 40. It should be understood that the circuit path in FIG. 2 embodying differential amplifier 100 and the transistors 102, 104, 106 compensates for a variation in the temperature of a fixed disk 12 from a reference temperature. On the other hand, the signal provided by differential amplifier 88 to the junction 98 via transistor 92 is a function of the difference in temperature between the removable and fixed disks 12 and 14.

Figure 3:
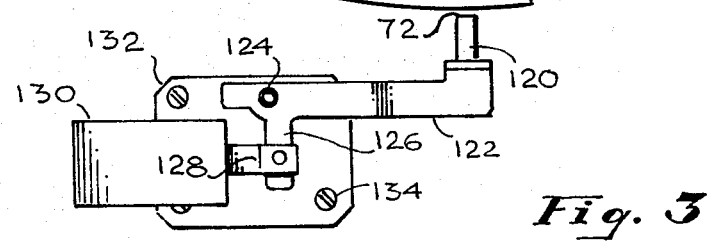
FIG. 3 illustrates a preferred manner of mounting a temperature sensor adjacent to a removable disk in accordance with the present invention.

Attention is now called to FIG. 3 which illustrates a preferred form of mounting the thermistor 72 relative to the removable disk 14. The thermistor 72 is preferably mounted in a holder 120 supported in a bracket 122 mounted for pivotal movement about pivot pin 124. The bracket 122 includes an arm 126 coupled to the armature 128 of a solenoid 130. The solenoid 130 is mounted onto a frame structure 132. Mounting screws 134 extend through oversized holes in the frame structure 132 and into the drive structure base plate to permit the position of the frame structure 132 to be adjusted relative to the disk 14.

When the solenoid 130 is deenergized, the thermistor 72 will move to an operative position very close to the edge of disk 14, e.g. 0.030–0.050 inches. On the other hand, when the solenoid 130 is energized, the bracket 122 is pivoted about pin 124 to move the thermistor 72 to an inoperative position in which it is spaced sufficiently from the disk 14 to afford clearance to enable the disk to be easily removed from the drive. Whereas the thermistor 72 is mounted for movement between an operative and an inoperative position, the thermistor 70 (FIGS. 1 and 2) is fixedly positioned very close to the fixed disk, preferably within 0.030–0.050 inches of the disk edge.

From the foregoing, it should now be recognized that a head positioning system has been disclosed herein for use in a magnetic disk drive employing both fixed and removable disks which system is characterized by the use of temperature sensors positioned within less than 0.1 inches of the disks. The temperature sensors produce a signal indicative of the temperature difference between the fixed and removable disk which difference is utilized to modify the current supplied to the positioner coil to compensate for the differences in thermal expansion exhibited by the disks. The temperature compensation system in accordance with the invention is particularly useful because it eliminates undue operational delays after a removable disk is placed into a drive. The temperature compensation in accordance with the invention modifies the positioning of the magnetic heads to compensate for differences in thermal expansion of the two disks keeping the magnetic head on the selected data track and enabling reliable write and read operation without an extended warmup period.

Although particular embodiments of the invention have been described and illustrated herein, it is recognized that modifications and variations may readily occur to those skilled in the art, and consequently it is intended that the claims be interpreted to cover such modifications and equivalents.

What is claimed is:

1. A head positioning system for use in a disk drive having a spindle carrying a first disk fixed thereto and a second disk removable therefrom, said positioning system including:
   address means for supplying digital signals identifying particular areas of said first and second disks;
   positioner coil means for moving heads over said first and second disks;
   control means responsive to said digital signals for producing a current applicable to said positioner coil to move said heads to said identified areas of said first and second disks;
   sensing means for producing a temperature signal indicative of the difference in temperature between said first and second disks; and
   compensation means responsive to said temperature signal for modifying said current applicable to said positioner coil.

2. The system of claim 1 wherein said control means includes summing amplifier means for producing said current; and wherein
   said compensation means includes means for supplying a compensation current to the input of said summing amplifier means.

3. The system of claim 1 wherein said sensing means includes first and second temperature sensors respectively mounted in close proximity to said first and second disks.

4. The system of claim 3 wherein said first and second temperature sensors comprise thermistors mounted within 0.100 inches of said first and second disks respectively.

5. The system of claim 3 wherein said second temperature sensor is mounted for movement from said first position in close proximity to said second disk to a second position remote therefrom to allow sufficient clearance for removal of said second disk.

6. The system of claim 5 further including electrically actuatable means for moving said second temperature sensor from said first to said second position.

7. A head positioning system for use in a disk drive having a spindle carrying a first disk fixed thereto and a second disk removable therefrom, said positioning system including:
   means for producing address signals indentifying particular areas of said first and second disks;
   means, including first and second temperature sensors respectively mounted in close proximity to said first and second disks, for producing a first signal indicative of the temperature difference between said first and second disks;
   means for producing a second signal indicative of the temperature difference between said first disk and a reference temperature; and
   means for combining said first and second signals with said address signals to thereby produce a temperature compensated position control signal.

8. The system of claim 7 further including mounting means supporting said second temperature sensor for movement between a first position within 0.100 inch of said second disk and a second position further spaced therefrom.

* * * * *